(12) United States Patent
Parkvall et al.

(10) Patent No.: US 8,234,535 B2
(45) Date of Patent: Jul. 31, 2012

(54) METHOD, RECEIVER AND TRANSMITTER FOR IMPROVED HYBRID AUTOMATIC REPEAT REQUEST

(75) Inventors: Stefan Parkvall, Stockholm (SE); Mats Sågfors, Kyrkslätt (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 967 days.

(21) Appl. No.: 12/296,371

(22) PCT Filed: Apr. 7, 2006

(86) PCT No.: PCT/SE2006/050062
§ 371 (c)(1),
(2), (4) Date: Oct. 7, 2008

(87) PCT Pub. No.: WO2007/117185
PCT Pub. Date: Oct. 18, 2007

(65) Prior Publication Data
US 2009/0164862 A1  Jun. 25, 2009

(51) Int. Cl.
*H04L 1/14* (2006.01)

(52) U.S. Cl. .................................. 714/750; 714/749
(58) Field of Classification Search .................. 455/450; 370/394, 335; 714/748, 749, 750
See application file for complete search history.

(56) References Cited

U.S. PATENT DOCUMENTS

| | | | | |
|---|---|---|---|---|
| 7,013,143 B2 * | 3/2006 | Love et al. | ..................... | 455/450 |
| 7,509,554 B2 * | 3/2009 | Lohr et al. | ..................... | 714/748 |
| 7,554,985 B2 * | 6/2009 | Ihm et al. | ..................... | 370/394 |
| 7,574,645 B2 * | 8/2009 | Pan et al. | ..................... | 714/748 |
| 7,673,211 B2 * | 3/2010 | Meyer et al. | ..................... | 714/748 |
| 8,151,154 B2 * | 4/2012 | Sagfors et al. | ..................... | 714/748 |
| 2002/0071407 A1 * | 6/2002 | Koo et al. | ..................... | 370/335 |
| 2005/0251722 A1 * | 11/2005 | Terry et al. | ..................... | 714/749 |
| 2008/0301515 A1 * | 12/2008 | Sagfors et al. | ..................... | 714/748 |

\* cited by examiner

*Primary Examiner* — David Ton

(57) ABSTRACT

The present invention relates to methods and a transmitter and a receiver for a mobile communication system. The basic idea of the present invention is to recursively derive from previous HARQ feedback the number of HARQ transmissions that is required to be able to decode the transmitted data successfully and to only transmit explicit HARQ feedback information if the decoding result differs from the derived result.

76 Claims, 5 Drawing Sheets

METHOD, RECEIVER AND TRANSMITTER FOR IMPROVED HYBRID AUTOMATIC REPEAT REQUEST

FIELD OF THE INVENTION

The present invention relates to arrangements in a mobile communication network. In particular, the present invention relates to an improvement of Hybrid Automatic repeat request (HARQ).

BACKGROUND OF THE INVENTION

The present invention relates to methods and arrangements in a mobile communication network adapted to use re-transmissions of the type Hybrid Automatic repeat request (HARQ). An example of such a communication network is a UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. Furthermore, the respective RNC 110 controls a plurality of Node-Bs 120,130 that are connected to the RNC by means of the Iub interface 140. Each Node B covers one or more cells and is arranged to serve the User Equipment (UE) 300 within said cell. Finally, the UE 300, also referred to as mobile terminal, is connected to one or more Node Bs over the Wideband Code Division Multiple Access (WCDMA) based radio interface 150.

Requirements for mobile data access are increasing and demand for bandwidth is growing. To meet these needs the High Speed Data Packet Access (HSDPA) specification has been defined. HSDPA is based on WCDMA evolution standardized as part of 3GPP Release 5 WCDMA specifications. HSDPA is a packet-based data service in WCDMA downlink with data transmission peak rate up to 14.4 Mbps over a 5 MHz bandwidth. Thus HSDPA improves system capacity and increases user data rates in the downlink direction. The improved performance is based on adaptive modulation and coding, a fast scheduling function and fast retransmissions with soft combining and incremental redundancy. HSDPA utilizes a transport channel named the High Speed Downlink Shared Channel (HS-DSCH) that makes efficient use of valuable radio frequency resources and takes bursty packet data into account. This is a shared transport channel which means that resources, such as channelization codes, transmission power and infra structure hardware, is shared between several users. HS-DSCH supports HARQ as a fast and resource-efficient method for combating transmission errors.

In 3GPP Release 6, the WCDMA standard is further extended with the Enhanced Uplink concept by introducing the Enhanced Dedicated Transport Channel, E-DCH. A further description can be found in 3GPP TS 25.309 "FDD Enhanced Uplink; Overall description". This concept introduces considerably higher peak data-rates in the WCDMA uplink. Features introduced with E-DCH include fast scheduling and fast Hybrid Automatic Repeat request (HARQ) with soft combining. Fast scheduling means that the Node B can indicate to each UE the rate the UE is allowed to transmit with. This can be done every TTI, i.e. fast. Thus, the network is able to control the interference in the system very well.

The Long Term Evolution of the UTRAN (LTE or E-UTRAN) also includes HARQ as an integral part of the methods to ensure transmission efficiency and reliability, whereby further information can be found in e.g. 3GPP TR 25.813.

The background and the description of the invention are described in the context of a UTRAN adapted for HSDPA and enhanced uplink, wherein HARQ is used. It should however be noted that HARQ is used in other wireless access systems such as E-UTRAN (or LTE), CDMA2000, WiMAX, which implies that the present invention is not limited to the use of WCDMA with HSDPA and enhanced uplink. The invention is applicable to any system or access technology supporting HARQ where the feedback is built on acknowledging or negatively acknowledging each received transmission unit, where this binary feedback is based on the successfulness of the reception and decoding of the transmission unit.

HARQ is an efficient solution for providing reliable and resource preserving ARQ over fading channels. Further, HARQ is a more advanced form of an ARQ retransmission scheme. In conventional ARQ schemes the receiver checks if a packet is received correctly. If it is not received correctly, the erroneous packet is discarded and a retransmission is requested. With HARQ the erroneous packet is not discarded. Instead the packet is kept and soft combined with the retransmission. That implies that even if neither the first transmission nor the retransmission would facilitate a successful decoding when received alone, they may be combined to decode the packet correctly. This means that, compared to conventional ARQ, less transmission power and fewer retransmissions are required on average.

To facilitate efficient HARQ, it is necessary for the receiver to feedback the success or failure of every transmission attempt. This is necessary so that the sender knows whether to continue with re-transmissions, or to terminate the HARQ process in question. This stands in contrast to many conventional ARQ schemes, where it is possible to deploy cumulative acknowledgements, such that feedback is provided less frequently. The fact that every HARQ transmission attempt need to be acknowledged or negatively acknowledged means that the transmission of HARQ feedback can turn out to be quite costly.

By example from UTRAN, it can be noted that one of the main differences of the uplink Dedicated transport CHannels (DCH) according to Release 99 uplink and E-DCH according to Release 6 is the fact that E-DCH supports HARQ. This means that the "average" transmission power for E-DCH can be kept lower, because stochastic transmission errors due to fading are corrected by the fast HARQ which is located in the Node B. HARQ using soft-combining results in a high power-efficiency with early-termination gain, etc. These aspects make the E-DCH an attractive and efficient solution.

However, HARQ also implies a cost of feedback signalling. Compared to the DCH, E-DCH may therefore result in additional resource consumption in the downlink direction (reverse to the data direction) due to the aforementioned need to send feedback on every HARQ transmission attempt.

The state-of-the-art ACK/NACK feedback mechanism for HARQ is now briefly described. Both HS-DSCH and E-DCH HARQ is based on multiple interleaved stop-and-wait ARQ processes with soft combining; as illustrated in FIG. 2. The receiver (the Node B in the uplink case) responds to a transmission with an ACK or NACK, so that a successful decoding results in ACK feedback, and unsuccessful result in NACK. To a NACK response, the sender (the UE in the uplink case) is "re-transmitting" on the same HARQ process by providing additional power/redundancy to the decoding process in the receiver. The ACK/NACK feedback is time-synchronized relative to the transmission time of the block it is acknowledging. Thus, no explicit reference to any block or sequence number is needed in the feedback. (The HARQ feedback is in the case of enhanced uplink carried over an E-DCH HARQ Acknowledgement Indicator Channel (E-HICH).)

The receiver performs soft combining of the multiple HARQ transmissions. An ACK reception in the UE results in a termination of the HARQ in that process, and that process can then be utilized for transmitting new data.

A challenge in the operation of HARQ is to achieve sufficient reliability without spending a lot of resources on the ACK/NACK feedback. It is known that miss-interpretation of the feedback can have severe effects on the performance. For small Transport Blocks and short TTIs in particular, the relative overhead of this signalling can turn out to be quite costly. This issue is known in WCDMA, and it is expected to be a challenge in LTE where it is likely that very short TTIs can be used.

The cost of HARQ feedback is particularly challenging if a high reliability is targeted, and the feedback channel is subject to fading.

The actual coding of the logical ACK/NACK feedback onto the physical channel can be made in many ways. Existing art includes the use of On-Off Keying (OOK), where NACK is mapped to DTX (no signal) and ACK is mapped to the "on" key in this binary constellation.

To further distinguish ACKs and NACKs—and to use DTX for "no transmission reception" or "no detection of transmission", Binary Phase Shift Keying can be used, such that ACK and NACK are both distinguished from DTX according to the signalling constellation in FIG. 5.

Thus, for further reference in this invention, a distinction is made between the logical HARQ feedback characterized by ACKs and NACKs, and the means to encode, transmit and decode this logical HARQ feedback from the receiver to the sender.

By means of the present invention, it is possible to significantly reduce the amount of transmitted feedback, by utilizing the proposed method to encode and decode the logical HARQ feedback. This is achieved without affecting the integrity (information content) of the logical HARQ feedback information.

FIG. 3 illustrates the HARQ behaviour for a single process. Here, most transmissions are successful with a single transmission, except block #3, which require two transmissions. The subscript denotes the retransmission sequence number.

FIG. 4 illustrates the HARQ behaviour when the decoding requires several HARQ transmissions. The first and the second block is successfully decoded after three HARQ transmissions, while the third block required only two transmissions for successful decoding.

From FIGS. 3 and 4, it can be observed that in the most cases, the number of HARQ transmissions needed for successful decoding of the payload is correlated over time.

For example in FIG. 3, most of the transmissions are successful with just one HARQ transmission. Similarly, in FIG. 4, the decoding is very unlikely to be successful for the first few HARQ transmissions, and only the following are likely to give any successful outcome. Thus, most of the transmitted feedback is obsolete.

Below, different methods from existing art are illustrated disclosing how coding of logical HARQ feedback can be done in different ways.

If it is known that the distribution of ACKs and NACKs is very biased, e.g. if 90% of the feedback is NACK, then it is possible to use On-Off Keying (OOK), so that DTX is mapped to the dominating logical value of the feedback. This is used e.g. from the non-serving cells of E-DCH, which are expected to be unsuccessful (NACK) in a majority of their de-coding attempts (assuming the serving cell typically controls the strongest uplink in SoHo).

BPSK is used from the E-DCH serving cell, since it is desired to distinguish idle periods (or failure to detect a transmission attempt) from a failure in decoding of a received transmission attempt. The serving cell is the cell in primary control of the resources assigned to the terminal.

However, the efficiency of the approach of using OOK is very much dependent on the operating condition: A high success-rate i.e. when ACKs are dominating will then result in a high feedback cost, since a lot of ACKs need to be explicitly transmitted on the physical channel.

On the contrary, using OOK for encoding DTX to ACK in a situation where "ACK" is dominating could be quite risky: In case the feedback (or transmission) is lost completely, the interpretation of DTX to ACK will result in a packet loss, since the absence of any physical feedback transmission will be interpreted as can ACK, i.e. a success by the data transmitter.

Alternatively and quite similar to the OOK approach above, the receiver may decide on the power/resource for ACK and NACK in BSPK. In an extreme case, very limited power is used for NACK, i.e. it is very close to DTX. However, this solution suffers from the same drawbacks noted above.

Mapping ACK close to DTX in case ACKs dominate the feedback suffers the risk of misinterpreting ACKs to DTX and maybe even DTX to ACK. This could result in unnecessary retransmissions and maybe also loss of data, since according to current art the sender is obliged re-transmit on DTX detection.

Accordingly, it is desired to achieve sufficient reliability of the HARQ feedback without spending a lot of resources on the ACK/NACK feedback that does not suffer from the above mentioned drawbacks.

SUMMARY

The object of the present invention is thus to reduce feedback signalling overhead and resource consumption for realizing this feedback in a system using HARQ.

Thus the object of the present invention is achieved by the methods and the arrangements according to the independent claims.

According to a first aspect of the present invention, a method for a receiver of a wireless communication system using HARQ is provided. The receiver is adapted to transmit binary logical HARQ feedback information, i.e. ACK and NACK on a first channel in response to a decoding result of data received on a second channel at the receiver transmitted from a transmitter. The method comprises the step of transmitting explicit HARQ feedback information only if the decoding result differs from an expected result wherein the expected result is derived recursively from previous logical HARQ feedback information, wherein the method for deriving the expected result is known at the receiver and at the transmitter.

According to a second aspect of the present invention, a method for a transmitter of a wireless communication system using HARQ is provided. The transmitter is adapted to receive binary logical HARQ feedback information, i.e. ACK or NACK on a first channel in response to a decoding result of data transmitted on a second channel to the receiver transmitted from a transmitter. The method comprises the step of receiving explicit HARQ feedback information only if the decoding result differs from an expected result wherein the expected result is derived recursively from previous logical HARQ feedback information, wherein the method for deriving the expected result is known at the receiver and at the transmitter.

According to a third aspect of the present invention, a receiver adapted to transmit binary logical HARQ feedback information is provided. The receiver comprises means for transmitting explicit HARQ feedback information only if the decoding result differs from an expected result wherein the expected result is derived recursively from previous logical HARQ feedback information, wherein the method for deriving the expected result is known at the receiver and at the transmitter.

According to a fourth aspect of the present invention, a transmitter adapted to receive and interpret binary logical HARQ feedback information is provided. The transmitter comprises means for receiving explicit HARQ feedback information only if the decoding result differs from an expected result wherein the expected result is derived recursively from previous logical HARQ feedback information, wherein the method for deriving the expected result is known at the receiver and at the transmitter.

According to an embodiment of the invention the transmission of HARQ feedback information is omitted if the decoding result is an expected result wherein the expected result is derived recursively from previous logical HARQ feedback information.

According to a further embodiment the Hybrid ARQ protocol is implemented using multiple interleaved stop-and-wait Hybrid ARQ processes.

According to a further embodiment the expected result is the same as the decoding result of the last previous transmission wherein multiple interleaved stop-and-wait HARQ processes may be used.

According to a further embodiment, the HARQ protocol deploys multiple transmission attempts, whereby the expected result for the current re-transmission attempt is the same as the decoding result of a previous re-transmission attempt having the same number of re-transmission attempts, whereby multiple interleaved stop-and-wait HARQ processes may be used.

According to a further embodiment the (re)-transmission attempt may be sent from the transmitter to the receiver with a Retransmission Sequence Number, RSN.

According to a further embodiment means are provided for looking into a re-transmission sequence number and checking the expected outcome for said re-transmission sequence number in order to check if the decoding result differs from an expected result.

According to a further embodiment a learning phase is performed, where the learning phase implies that explicit HARQ feedback is transmitted at times when there exist no previous HARQ feedback information in the transmitter and receiver.

According to further embodiments explicit HARQ feedback may be sent on demand, periodically or upon detection of HARQ feedback misinterpretation.

According to a further embodiment the detection of HARQ feedback misinterpretation is based on the detected transmitter behavior, such that positive HARQ feedback interpreted in the sender as negative HARQ feedback result in a redundant re-transmission in the HARQ process, negative HARQ feedback but interpreted in the sender as positive HARQ feedback result in a premature termination of the HARQ in that process. Means may also be provided for notifying the sender that it has made this erroneous feedback judgement by sending explicit HARQ feedback for that HARQ process during a pre-defined period of time.

According to one alternative, the transmitter comprises means for transmitting information concerning the method to derive the expected result to the receiver. The method is preferably stored in the network, e.g. in a base station, therefore this case is applicable to downlink transmission. According to another alternative, the receiver comprises means for transmitting information concerning the method to derive the expected result to the transmitter. The method is preferably stored in the network, e.g. in a base station, therefore this case is applicable to uplink transmission.

The communication system is a WCDMA system according to one embodiment of the present invention. The first channel may be a HARQ Acknowledgement Indicator Channel, E-HICH and the second channel may be an E-DCH. The first channel may also be a high-speed dedicated physical control channel, HS-DPCCH and the second channel may be a HS-DSCH. According to another embodiment the communication system is the Long Term Evolution of the UTRAN.

An advantage with the present invention is that it provides efficient feedback at different HARQ operating points. With the scheme of the present invention, the constellation difference between NACK, DTX, and ACK can be made large, so that misinterpretations are unlikely. Therefore, the invention has an indirect effect on the HARQ reliability.

DETAILED DESCRIPTION OF THE PRESENT INVENTION

Figure 1:
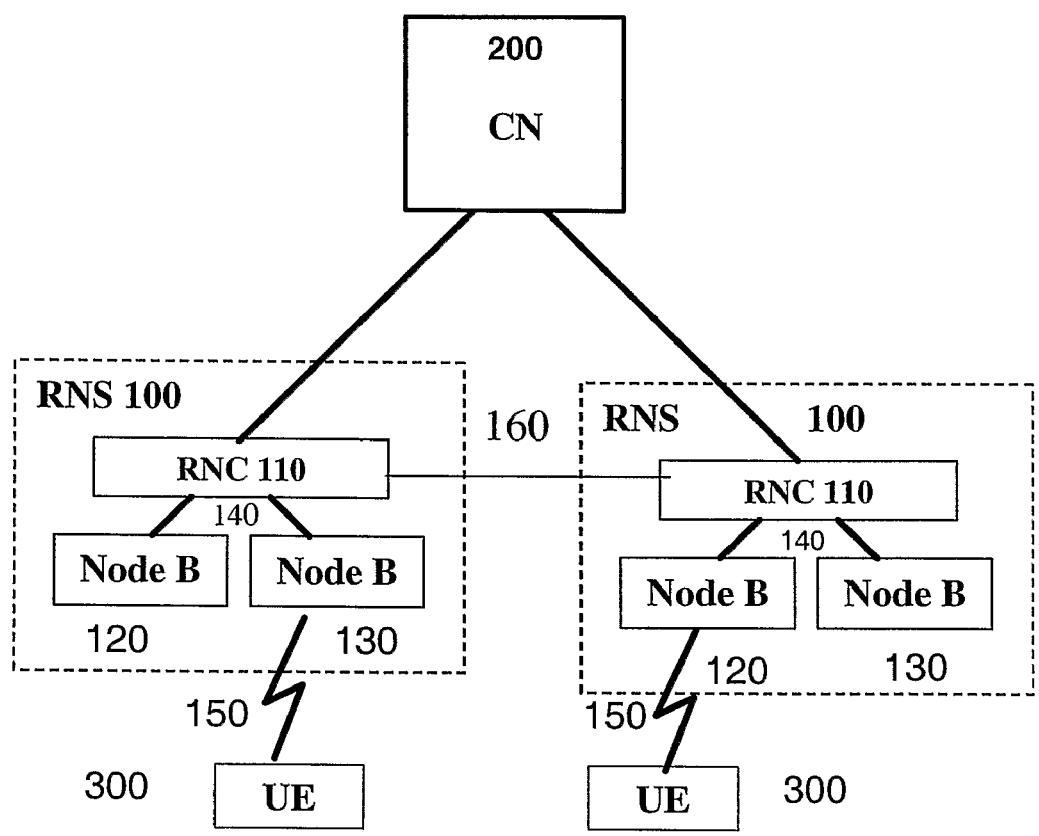
FIG. 1 illustrates a mobile telecommunication network wherein the present invention may be implemented.
Figure 2:
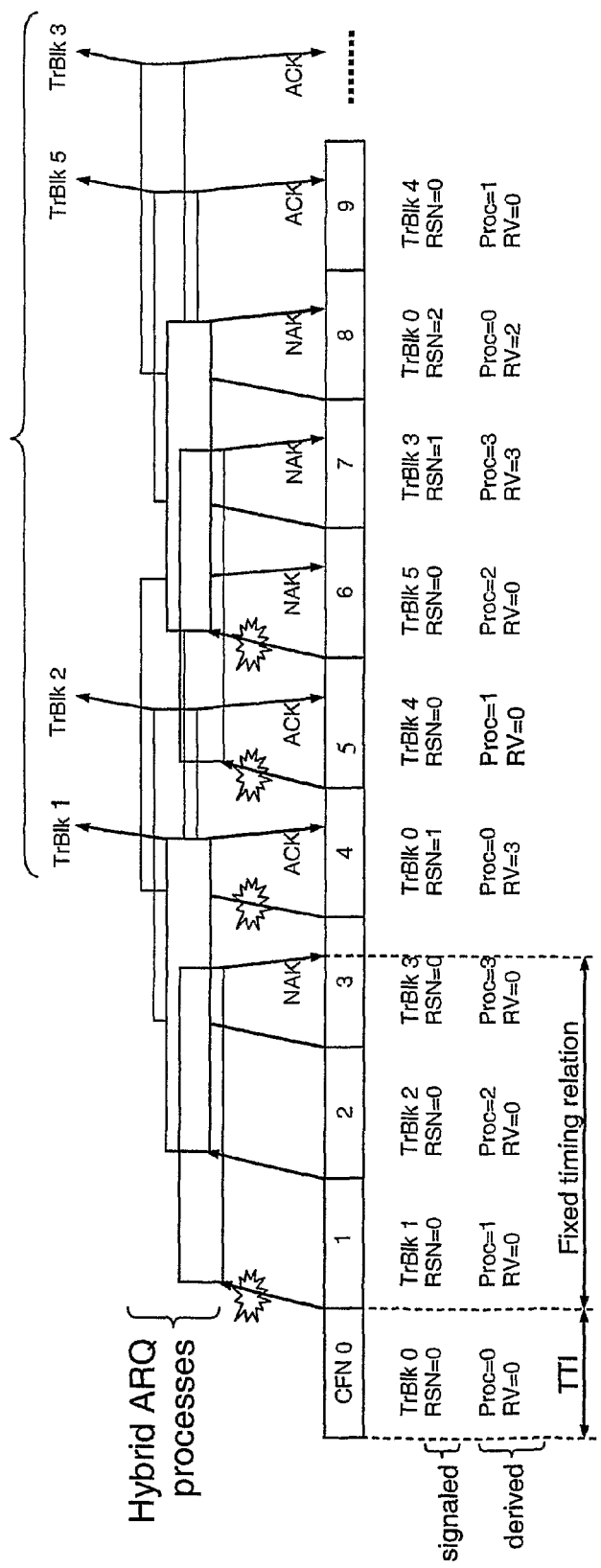
FIG. 2 shows a Protocol operation with multiple hybrid ARQ processes (four in this example) according to prior art, wherein the re-transmissions are synchronized, as in E-DCH.

The present invention will be described more fully hereinafter with reference to the accompanying drawings, in which preferred embodiments of the invention are shown. This invention may, however, be embodied in many different forms and should not be construed as limited to the embodiments set forth herein: rather, these embodiments are provided so that this disclosure will be thorough and complete, and will fully convey the scope of the invention to those skilled in the art.

The present invention relates to an improved HARQ realization and particularly to an improved HARQ realization e.g. for the E-DCH uplink in WCDMA network, for the downlink channel in HSDPA, HS-DSCH, or for the uplink or downlink channels in the Long Term Evolution of the UTRAN. It should however be noted that the invention concerns any system with HARQ and in particular for HARQ realized with multiple interleaved stop-and-wait HARQ processes. Further, the present invention relates to a HARQ receiver and a HARQ transmitter of a wireless communication system using HARQ. The receiver is adapted to encode and transmit logical HARQ feedback information on a first channel in response to a decoding result of data received on a second channel at the receiver transmitted from a transmitter. The transmitter is adapted to receive and decode logical HARQ feedback information on the first channel.

The basic idea of the present invention is to reduce the amount of actual signalling at the physical layer by efficient source coding of the logical HARQ feedback. This encoding and decoding of the logical HARQ feedback information is done by utilizing that fact that subsequent transmission events may have a similar level of probability for successful HARQ decoding. That implies that transmission of HARQ feedback information on the physical layer is only performed if the decoding result differs from an expected result wherein the expected result is derived recursively from previously sent HARQ feedback information. Further, the method for deriving [i.e. encoding and decoding] the expected result must be known at the receiver and at the transmitter. When a transmission of a HARQ feedback information is omitted [at the physical layer] due to the decoding result is equal to the expected result, a DTX is "transmitted" instead. Hence, the interpretation of a received DTX (i.e. the logical ACK or NACK) is dependent on the method for deriving the expected result.

The method for deriving [i.e. encoding and decoding] the expected result can be realized by a discrete memory filter defining the recursion for deriving the expected decoding outcome. That can be defined in many ways. However, it is desirable to define a recursive function that gives a high correlation between the expected outcome and the actual outcome. The present invention is not restricted to any particular function for deriving the expected HARQ decoding outcome, but some typical examples are given further below.

The type of recursion should therefore be determined from the correlation between feedback messages. The correlation function can be obtained by performing a correlation test between all feedback messages. In addition, the function for deriving the expected logical HARQ feedback can be based on e.g. the number of HARQ transmissions used, the size of the transmitted data unit (Transport Block, timing of the transmission, etc. I.e. the previously sent HARQ feedback information that the expected result is recursively derived from, is selected such that a high correlation is achieved between a current decoding result and the expected decoding result resulting from the derivation from said previously sent HARQ feedback information and the aspects associated with the previously sent HARQ feedback information.

Figure 3:
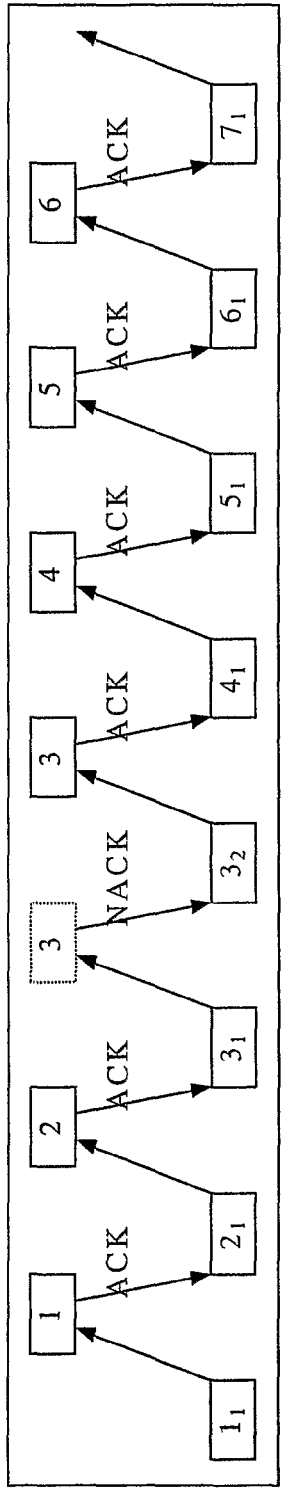
FIG. 3 illustrates the HARQ behaviour for a single process.

If the example in FIG. 3 is considered and it is assumed that only a very small fraction e.g. 1-10% of the first HARQ transmissions result in a decoding failure. Then most of the "ACK:s" in the feedback are unnecessary, and only the "exceptions" i.e. the NACK on the first transmission would be needed.

Figure 5:
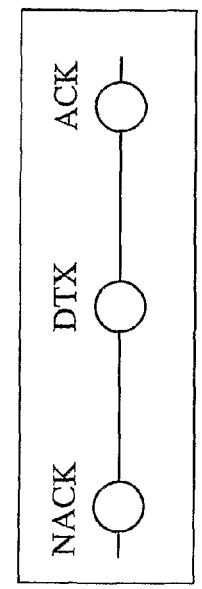
FIG. 5 illustrates the BSPK signal constellation for Serving Cell E-DCH HARQ feedback.

However, with a BPSK signal constellation (used e.g. in E-DCH, serving cell, and HS-DSCH) where both ACKs and NACKs are distinguished from DTX as shown in FIG. 5, excessive resources are spent on all the ACKs—knowing that 90-99% in the example-case are just plain ACKs.

Therefore, in order to reduce the need for spending excessive resources on HARQ feedback information, the present invention proposes to recursively derive an expected decoding result for a current transmission based on previously sent HARQ feedback information. In the example illustrated in FIG. 4, the expected result is equal to the decoding result of the last previous transmission. This implies that if the expected result is equal to the present decoding outcome, the logical HARQ feedback is mapped to DTX, i.e. no feedback on the physical layer is transmitted.

A transmission of a DTX implies in this specification that any transmission of HARQ feedback information is omitted on the physical layer in response to the successfully or unsuccessfully transmitted data depending on the expected data transmission decoding result. Thus, a DTX is interpreted as an ACK or NACK depending to the expected decoding result of data. Since the method for encoding and decoding of the logical HARQ feedback is the same both in the receiver and transmitter, the transmitter can decode the logical HARQ feedback from previous logical HARQ feedback at times when DTX is received on the physical layer.

Figure 4:
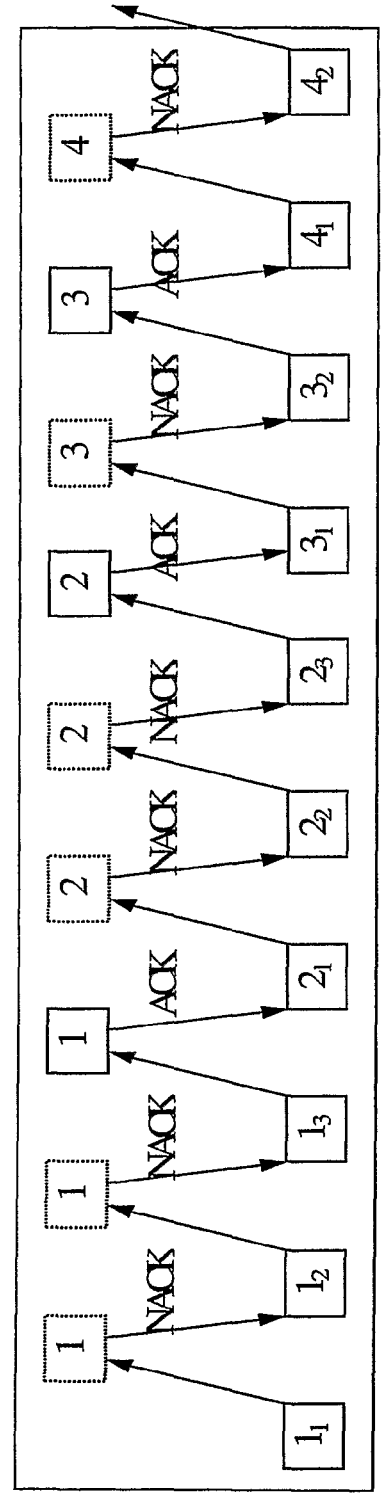
FIG. 4 illustrates the HARQ behaviour when the decoding requires a plurality of HARQ transmissions.
Figure 8:
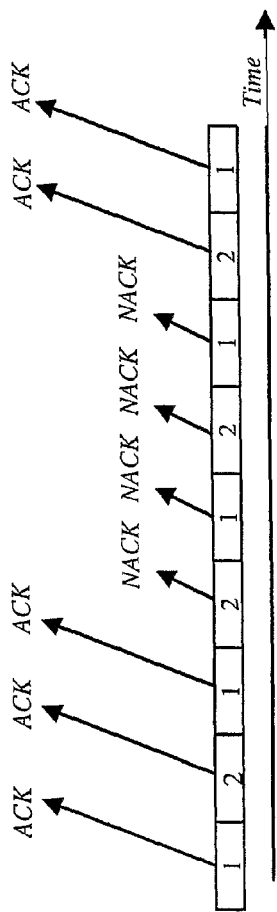
FIG. 8 illustrates a simplified example with two HARQ processes subject to fading according to the present invention.

For illustrative purposes, FIG. 3 and FIG. 4 only shows a single HARQ process. It should be understood that a typical HARQ implementation includes multiple such interleaved processes, and that the derivation of the expected outcome is not restricted to the behaviour of a single process. In particular, it should be noted that the interleaved processes typically may be subject to simultaneous fading, meaning that there is a high correlation of the decoding outcome between the HARQ processes. This is illustrated in FIG. 8, for a simplified example with two HARQ processes [typical HARQ implementations can have e.g. 4 or 8 processes, which is the case for E-DCH], where both processes experience concurrent decoding failures. Since both processes experience the same fading, there is a correlation between the feedback of the two processes. Thus, the expected feedback is preferably derived from the previous feedback of any other process. In this example, the logical HARQ feedback could be mapped to DTX if the logical HARQ feedback is the same as the most recent outcome for the other process.

With the invention, it is possible to make the "distances" (i.e. in terms of power) between NACK, DTX and ACK quite large, because explicit feedback on the physical layer is sent much more rarely. In fact, with the invention it is important to detect explicit NACK/ACK correctly, because any misinterpretation could propagate through the proposed recursion affecting multiple transmissions.

According to a preferred embodiment suitable for the simple and exemplified case with a high decoding probability on the first transmission, explicit HARQ feedback information (i.e. ACK/NACKs) are transmitted according to existing art as a learning phase. Then according to the example illustrated in FIG. 4, if the outcome of the present decoding is the same as the latest decoding event, then send DTX and if the outcome of the present decoding is different, then send ACK or NACK according to existing art.

Formally, this could be expressed as the following: To generate ACK/NACK feedback also denoted logical HARQ feedback information, for f(k) send DTX if f(k)=f(k−1), otherwise transmit explicit coding of f(k), i.e. explicit ACK/NACKs. f(k) is here the logical feedback (ACK/NACK) at time k.

A corresponding rule for the transmitter needs to be applied, i.e. reception of explicit ACK/NACK is interpreted according to existing art while DTX is interpreted according to f(k−1).

Figure 6:
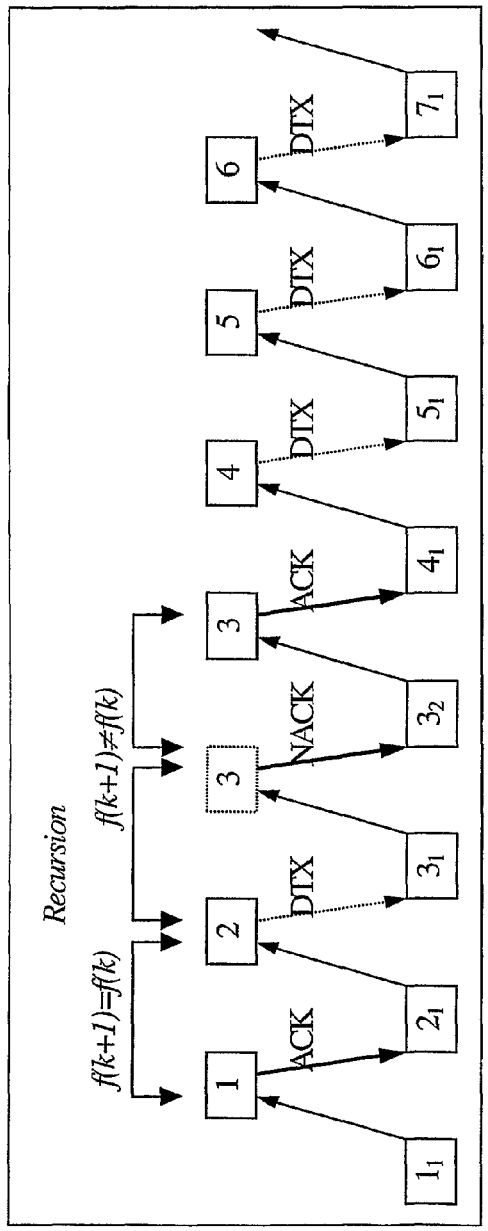
FIGS. 6 and 7 illustrate the mechanism according to the present invention, where HARQ feedback information is sent only when the result of the decoding-process differs from the expected result according to the present invention.

FIG. 6 illustrates the mechanism according to the present invention where ACK:s and NACKs are sent only when the outcome of the decoding-process differs from the recursion f(k)=f(k−1). That implies that no HARQ feedback information is transmitted at all, also referred to as transmission of DTX, if the decoding of the transmitted data goes as expected, i.e. that the decoding of the transmitted data goes as in the decoding of the last transmitted data. Thus, the resources are saved.

According to a further embodiment, the mechanism of the present invention comprises means for performing a learning phase during which explicit HARQ feedback information is sent. A minimum learning phase includes one recursion period, so that the recursion can be established. In the above mentioned example, a recursion period implies one transmission of data and one transmission of HARQ feedback information in response to the transmitted data. In general, the explicit feedback during the learning phase is needed in case the encoding and decoding of logical HARQ feedback cannot be based on previous logical HARQ feedback information.

This is illustrated in FIG. 6, wherein the first "ACK" message is sent in response to the first transmitted block as an initialization which also is referred to as the learning period. The subsequent transmission or omission of HARQ feedback information is then based on this initialization.

According to a further embodiment, in case of inactivity either due to "no data", or due to DTX on the HARQ feedback channel, it may be desirable to periodically or on demand send some explicit HARQ feedback.

It should be noted that various functions can be used for defining the type of recursion. In the example above, it is assumed that the DTX is used if the decoding result of a current transmission is equal to the decoding result of the last previous transmission.

A further example is disclosed below according to an additional preferred embodiment. If several HARQ re-transmissions are expected to be needed then, there will be a mixture of ACKs and NACKs, and it may not be wise to correlate the current feedback to the most recent ACK/NACK as in the above-described embodiment. Instead, the HARQ feedback recursion is also preferably based on the Retransmission Sequence Number (RSN) such that the expected HARQ decoding result is the one derived from the most recent decoding outcome (logical HARQ feedback) when an equal amount of HARQ retransmissions [RSN] where used.

Figure 7:
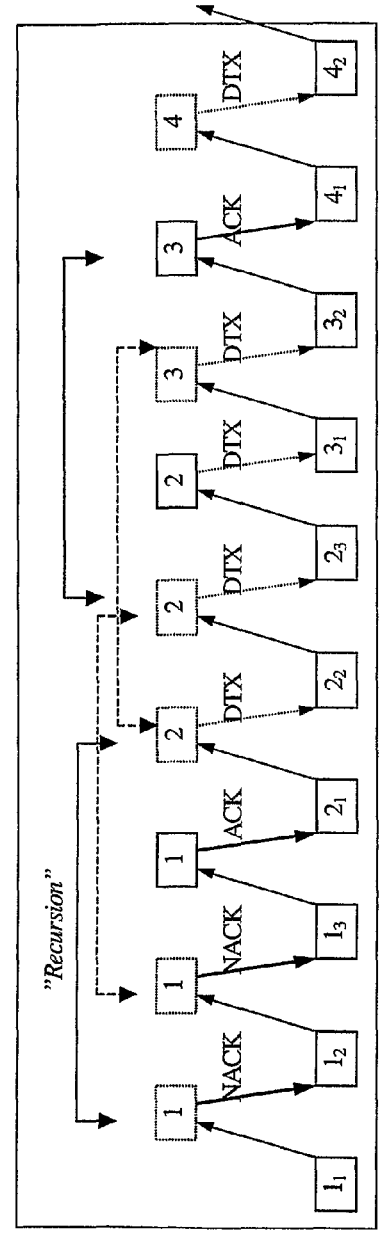

This is illustrated in FIG. 7. For illustrative simplicity, FIG. 7 illustrates a single HARQ process. It should be readily understood that the solution is equally applicable to a solution with multiple interleaved HARQ processes.

Turning now to FIG. 7 which is an illustration of the proposed mechanism, where it is expected that the result of the decoding of the current transmission having RNS x will be the same as the result of the last time at a retransmission having RNS x was required. I.e., ACKs and NACKs are explicitly sent on the physical layer only in case the outcome of the decoding for RSN x differs form a previous logical HARQ feedback having a RSN x. For the first transport block, the HARQ recursion is initialized by sending explicit feedback information on the physical layer. Then, the logical HARQ feedback is mapped to DTX if the feedback is equal to the previous feedback with the same RSN. For the second block, no explicit HARQ feedback on the physical layer was needed, because the decoding was successful after equal number of HARQ attempts. The recursion is set, so that DTX maps to the feedback given for the previous transmission with a particular RSN. Thus, explicit feedback is sent for all transmissions of the first data block. Note that no HARQ feedback information (only DTX is transmitted) is needed for the second block, as it also experiences three HARQ transmissions. The transmission of the third block is terminated after two transmissions using explicit ACK feedback.

Note that in a HARQ with multiple interleaved processes, the expected HARQ outcome could be derived from the logical HARQ feedback of any of the active processes. Alternatively, the recursion could be independent for each HARQ process.

Formally, the recursion rule can be defined as: If the outcome of the present decoding having RSN x is the same as it was for the last previous transmission for the RSN x, then send DTX.

If the outcome of the present decoding having RSN x is different from a previous transmission for the RSN x, then map ACK or NACK onto the physical layer according to existing art.

Evidently, a corresponding rule is needed for the transmitter, such that the transmitter is able to interpret the received HARQ feedback information or the omission of HARQ feedback information, i.e. transmission of DTX. It should also be noted that DTX has a different meaning whether an ACK or a NACK is expected!

Figure 9:
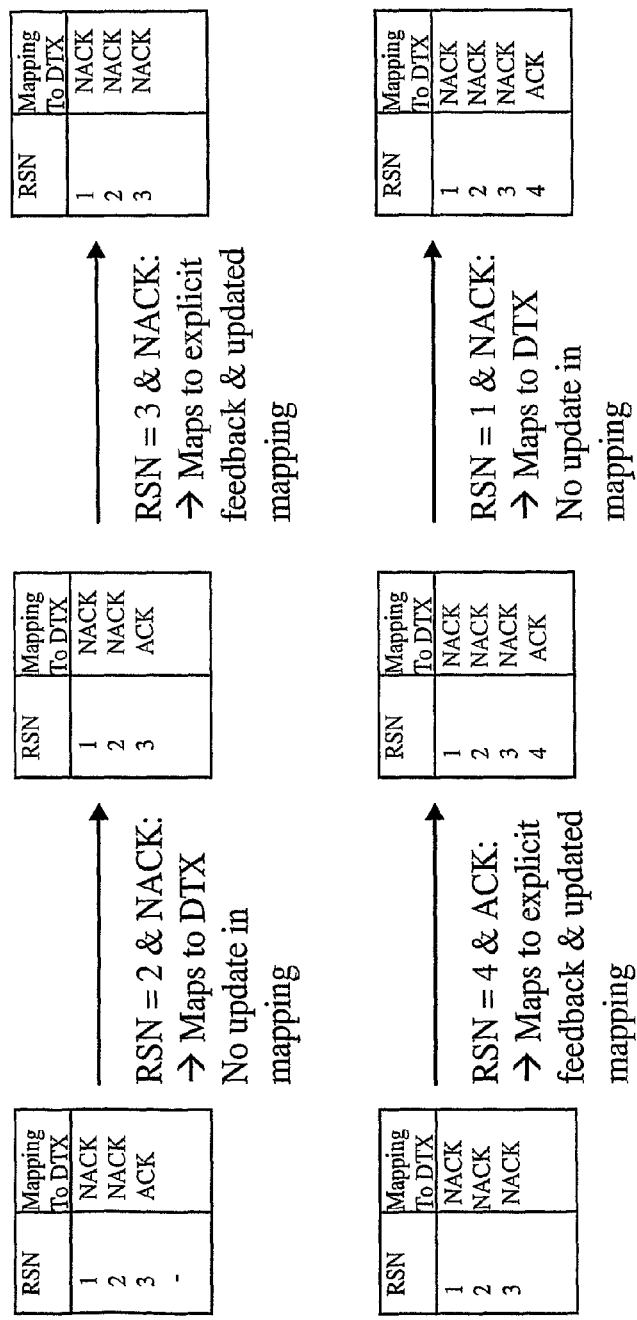
FIG. 9 shows a table according to an embodiment of the present invention showing how to map (encode) logical HARQ feedback to DTX (the receiver), and how to map (decode) DTX to logical HARQ feedback [the transmitter].

The solution can also be exemplified by means of a table in the receiver and transmitter, where the table is updated every time the logical feedback is mapped to explicit HARQ feedback. This is illustrated in FIG. 9, where both the transmitter and receiver is maintaining a table for how to map (encode) logical HARQ feedback to DTX (the receiver), and how to map (decode) DTX to logical HARQ feedback [the transmitter].

Furthermore, the transmitter and the receiver comprises preferably means for looking into a re-transmission sequence number, checking the expected outcome for said re-transmission sequence number in order to check if the decoding result differs from an expected result.

Also, to facilitate the above described behaviour, i.e. to make sure that the sender knows how to interpret DTX on the different HARQ transmissions, it is required to be aware of the method for recursively deriving the expected result and hence how the receiver shall interpret DTX. This method has to be agreed between the sending and receiving peers and is preferably stored in the network, e.g. the node B and communicated to the UE.

In (rare) cases, when the receiver does not detect any transmission at all. DTX may result in a miss-interpretation of the feedback resulting in a loss of data.

It should then be possible to reduce the risk of [ACK to NACK] and [NACK to ACK] errors in the proposed mechanism, because more resources could be assigned to this explicit feedback. However, should there be an error, it is important to detect and recover from those, as the error could otherwise propagate through recursion to multiple transmissions.

The errors can be detected in the receiver and the received should then notify the transmitter whereby this would result in transmission of explicit feedback information to "re-calibrate" the recursion, i.e. re-applying the learning period during a pre-defined period. I.e. explicit HARQ feedback information may be transmitted on demand. Explicit HARQ feedback information can also be transmitted periodically.

Similarly, should a DTX be mis-interpreted, this will be recognized in the receiver by the sender behaviour in the HARQ process:

An ACK encoded to DTX but interpreted in the sender as NACK will be seen as a redundant re-transmission in the HARQ process (i.e. RSN is stepped up).

A NACK encoded to DTX but interpreted in the sender as ACK will be seen as a premature termination of the HARQ in that process.

This recovery mechanism also ensures that not too many data blocks are lost in a row which happens if a NACK encoded to DTX is decoded as ACK.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for a receiver of a wireless communication system using Hybrid ARQ, HARQ, wherein the receiver is adapted to transmit binary logical HARQ feedback information on a first channel in response to a decoding result of data received on a second channel at the receiver transmitted from a transmitter, characterised in that the method comprises the step of:
   transmitting explicit HARQ feedback information only if the decoding result differs from an expected result wherein the expected result is derived recursively from previous logical HARQ feedback information, wherein the method for deriving the expected result is known at the receiver and at the transmitter.

2. The method according to claim 1, wherein it comprises the further step of:
   omitting transmission of HARQ feedback information if the decoding result is an expected result wherein the expected result is derived recursively from previous logical HARQ feedback information.

3. The method according to claim 1, wherein the Hybrid ARQ protocol is implemented using multiple interleaved stop-and-wait Hybrid ARQ processes.

4. The method according to claim 1, wherein the expected result is the same as the decoding result of the last previous transmission.

5. The method according to claim 1, wherein the expected result is the same as the decoding result of the last previous transmission for the present process in a HARQ protocol using multiple interleaved stop-and-wait HARQ processes.

6. The method according to claim 1, comprising the further step of:
   the HARQ protocol deploying multiple transmission attempts, whereby the expected result for the current re-transmission attempt is the same as the decoding result of a previous re-transmission attempt having the same number of re-transmission attempts.

7. The method according to claim 6, comprising the further step of receiving the (re)-transmission attempt from the transmitter with a Retransmission Sequence Number, RSN.

8. The method according to claim 1, wherein it comprises the further steps of:
   looking into a re-transmission sequence number,
   checking the expected outcome for said re-transmission sequence number in order to check if the decoding result differs from an expected result.

9. The method according to claim 1, wherein the learning phase comprises the step of sending explicit HARQ feedback at times when there exist no previous HARQ feedback information in the transmitter and receiver.

10. The method according to claim 1, wherein it comprises the further step of:
    sending explicit HARQ feedback on demand.

11. The method according to claim 1, wherein it comprises the further step of:
    sending explicit HARQ feedback periodically.

12. The method according to claim 1 wherein it comprises the further step of:
    sending explicit HARQ feedback upon detection of HARQ feedback misinterpretation.

13. The method according to claim 1, wherein the detection of HARQ feedback misinterpretation is based on the detected transmitter behavior, such that positive HARQ feedback interpreted in the sender as negative HARQ feedback result in a redundant re-transmission in the HARQ process, negative HARQ feedback but interpreted in the sender as positive HARQ feedback result in a premature termination of the HARQ in that process.

14. The method according to claim 13, wherein it comprises the further step of:
    notifying the sender that it has made this erroneous feedback judgement by sending explicit HARQ feedback for that HARQ process during a pre-defined period of time.

15. The method according to claim 1, comprising the further step of transmitting information concerning the method to derive the expected result to the transmitter.

16. The method according to claim 1, comprising the further step of receiving information concerning the method to derive the expected result from the transmitter.

17. The method according to claim 1, wherein the communication system is a WCDMA system.

18. The method according to claim 17, wherein the first channel is a HARQ Acknowledgement Indicator Channel, E-HICH and that the second channel is an E-DCH.

19. The method according to claim 17, wherein the first channel is a high-speed dedicated physical control channel, HS-DPCCH and that the second channel is a HS-DSCH.

20. The method according to claim 1, wherein the communication system is the Long Term Evolution of the UTRAN.

21. A method for a transmitter of a wireless communication system using Hybrid ARQ, HARQ, wherein the transmitter is adapted to receive binary logical HARQ feedback information on a first channel in response to a decoding result of data transmitted on a second channel to the receiver transmitted from a transmitter, wherein the method comprises the step of:
    receiving explicit HARQ feedback information only if the decoding result differs from an expected result wherein the expected result is derived recursively from previous logical HARQ feedback information, wherein the method for deriving the expected result is known at the receiver and at the transmitter.

22. The method according to claim 21, wherein it comprises the further step of:
    interpreting a detection of an omitted transmission of HARQ feedback information as if the decoding result is an expected result wherein the expected result is derived recursively from previous logical HARQ feedback information.

23. The method according to claim 21, wherein the Hybrid ARQ protocol is implemented using multiple interleaved stop-and-wait Hybrid ARQ processes.

24. The method according to claim 21, wherein the expected result is the same as the logical HARQ feedback information of the last previous transmission.

25. The method according to claim 21, wherein the expected result is the same as the logical HARQ feedback information of the last previous transmission for the present process in a HARQ protocol using multiple interleaved stop-and-wait HARQ processes.

26. The method according to claim 21, comprising the further step of:
    the HARQ protocol deploying multiple transmission attempts, whereby the expected result for the current re-transmission attempt is the same as the logical HARQ feedback information of a previous re-transmission attempt having the same number of re-transmission attempts.

27. The method according to claim 26, comprising the further step of signalling the (re)-transmission attempt to the receiver with a Retransmission Sequence Number, RSN.

28. The method according to claim 21, wherein it comprises the further steps of:
looking into a re-transmission sequence number,
checking the expected outcome for said re-transmission sequence number in order to check if the logical HARQ feedback differs from an expected result.

29. The method according to claim 21, wherein it comprises the further step of:
receiving explicit HARQ feedback on demand.

30. The method according to claim 21, wherein it comprises the further step of:
receiving explicit HARQ feedback periodically.

31. The method according to claim 21 wherein it comprises the further step of:
receiving explicit HARQ feedback upon detection of HARQ feedback misinterpretation.

32. The method according to claim 31, wherein it comprises the further step of:
receiving a notification that it has made this erroneous feedback judgement by receiving explicit HARQ feedback for that HARQ process during a pre-defined period of time.

33. The method according to claim 21, comprising the further step of receiving information concerning the method to derive the expected result from the receiver.

34. The method according to claim 21, comprising the further step of sending information concerning the method to derive the expected result to the receiver.

35. The method according to claim 21, wherein the communication system is a WCDMA system.

36. The method according to claim 35, wherein the first channel is a HARQ Acknowledgement Indicator Channel, E-HICH and that the second channel is an E-DCH.

37. The method according to claim 36, wherein the first channel is a high-speed dedicated physical control channel, HS-DPCCH and that the second channel is a HS-DSCH.

38. The method according to claim 21, wherein the communication system is the Long Term Evolution of the UTRAN.

39. A receiver of a wireless communication system using Hybrid ARQ, HARQ, wherein the receiver is adapted to transmit binary logical HARQ feedback information on a first channel in response to a decoding result of data received on a second channel at the receiver transmitted from a transmitter, comprising
means for transmitting explicit HARQ feedback information only if the decoding result differs from an expected result wherein the expected result is derived recursively from previous logical HARQ feedback information, wherein the method for deriving the expected result is known at the receiver and at the transmitter.

40. The receiver according to claim 39, wherein it comprises means for omitting transmission of HARQ feedback information if the decoding result is an expected result wherein the expected result is derived recursively from previous logical HARQ feedback information.

41. The receiver according to claim 39, wherein the Hybrid ARQ protocol is implemented using multiple interleaved stop-and-wait Hybrid ARQ processes.

42. The receiver according to claim 39, wherein the expected result is the same as the decoding result of the last previous transmission.

43. The receiver according to claim 39, wherein the expected result is the same as the decoding result of the last previous transmission for the present process in a HARQ protocol using multiple interleaved stop-and-wait HARQ processes.

44. The receiver according to claim 39, comprising the further means for the HARQ protocol deploying multiple transmission attempts, whereby the expected result for the current re-transmission attempt is the same as the decoding result of a previous re-transmission attempt having the same number of re-transmission attempts.

45. The receiver according to claim 44, comprising the further means for receiving the (re)-transmission attempt from the transmitter with a Retransmission Sequence Number, RSN.

46. The receiver according to claim 39, wherein it comprises the further means for looking into a re-transmission sequence number, means for checking the expected outcome for said re-transmission sequence number in order to check if the decoding result differs from an expected result.

47. The receiver according to claim 39, wherein it comprises means for performing a learning phase wherein the learning phase comprises the step of sending explicit HARQ feedback at times when there exist no previous HARQ feedback information in the transmitter and receiver.

48. The receiver according to claim 39, wherein it comprises tine further means for sending explicit HARQ feedback on demand.

49. The receiver according to claim 39, wherein it comprises the further means for sending explicit HARQ feedback periodically.

50. The receiver according to claim 39 wherein it comprises the further means for sending explicit HARQ feedback upon detection of HARQ feedback misinterpretation.

51. The receiver according to claim 50, wherein the detection of HARQ feedback misinterpretation is based on the detected transmitter behavior, such that positive HARQ feedback interpreted in the sender as negative HARQ feedback result in a redundant re-transmission in the HARQ process, negative HARQ feedback but interpreted in the sender as positive HARQ feedback result in a premature termination of the HARQ in that process.

52. The receiver according to claim 51, wherein it comprises the further means for notifying the sender that it has made this erroneous feedback judgement by sending explicit HARQ feedback for that HARQ process during a pre-defined period of time.

53. The receiver according to claim 39, comprising the further means for transmitting information concerning the method to derive the expected result to the transmitter.

54. The receiver according to claim 39, comprising the further means for receiving information concerning the method to derive the expected result from the transmitter.

55. The receiver according to claim 39, wherein the communication system is a WCDMA system.

56. The receiver according to claim 55, wherein the first channel is a HARQ Acknowledgement Indicator Channel, E-HICH and that the second channel is an E-DCH.

57. The receiver according to claim 55, wherein the first channel is a high-speed dedicated physical control channel, HS-DPCCH and that the second channel is a HS-DSCH.

58. The receiver according to claim 39, wherein the communication system is the Long Term Evolution of the UTRAN.

59. A transmitter of a wireless communication system using Hybrid ARQ, HARQ, wherein the transmitter is adapted to receive binary logical HARQ feedback information on a first channel in response to a decoding result of data transmitted on a second channel to the receiver transmitted from a transmitter, comprising means for receiving explicit HARQ feedback information only if the decoding result differs from an expected result wherein the expected result is derived recursively from previous logical HARQ feedback information, wherein the method for deriving the expected result is known at the receiver and at the transmitter.

60. The transmitter according to claim 59, wherein it comprises the further means for interpreting a detection of an omitted transmission of HARQ feedback information as if the decoding result is an expected result wherein the expected result is derived recursively from previous logical HARQ feedback information.

61. The transmitter according to claim 59, wherein the Hybrid ARQ protocol is implemented using multiple interleaved stop-and-wait Hybrid ARQ processes.

62. The transmitter according to claim 59, wherein the expected result is the same as the logical HARQ feedback of the last previous transmission.

63. The transmitter according to claim 59, comprising the further means for the HARQ protocol deploying multiple transmission attempts, whereby the expected result for the current re-transmission attempt is the same as the logical HARQ feedback of a previous re-transmission attempt having the same number of re-transmission attempts.

64. The transmitter according to claim 63, comprising the further means for signalling the (re)-transmission attempt to the receiver with a Retransmission Sequence Number, RSN.

65. The transmitter according to claim 59, wherein it comprises the further means for looking into a re-transmission sequence number, and means for checking the expected outcome for said re-transmission sequence number in order to check if the logical feedback differs from an expected result.

66. The transmitter according to claim 59, wherein it comprises the further means for receiving explicit HARQ feedback on demand.

67. The transmitter according to claim 59, wherein it comprises the further means for receiving explicit HARQ feedback periodically.

68. The transmitter according to claim 59 wherein it comprises the further means for receiving explicit HARQ feedback upon detection of HARQ feedback misinterpretation.

69. The transmitter according to claim 68, wherein the detection of HARQ feedback misinterpretation is based on the detected transmitter behavior, such that an intended positive HARQ feedback interpreted in the sender as negative HARQ feedback results in a redundant re-transmission in the HARQ process, and an intended negative HARQ feedback but interpreted in the sender as positive HARQ feedback results in a premature termination of the HARQ in that process.

70. The transmitter according to claim 69, wherein it comprises the further means for receiving a notification that it has made this erroneous feedback judgement by receiving explicit HARQ feedback for that HARQ process during a pre-defined period of time.

71. The transmitter according to claim 59, comprising the further means for receiving information concerning the method to derive the expected result from the receiver.

72. The transmitter according to claim 59, comprising the further means for sending information concerning the method to derive the expected result to the receiver.

73. The transmitter according to claim 59, wherein the communication system is a WCDMA system.

74. The transmitter according to claim 73, wherein the first channel is a MARQ Acknowledgement Indicator Channel E-I HCH and that the second channel is an E DCH.

75. The transmitter according to claim 73, wherein the first channel is a high-speed dedicated physical control channel, HS-DPCCH and that the second channel is a HS-DSCH.

76. The transmitter according to claim 59, wherein the communication system is the Long Term Evolution of the UTFIAN.

* * * * *

UNITED STATES PATENT AND TRADEMARK OFFICE
CERTIFICATE OF CORRECTION

| | | |
|---|---|---|
| PATENT NO. | : 8,234,535 B2 | Page 1 of 1 |
| APPLICATION NO. | : 12/296371 | |
| DATED | : July 31, 2012 | |
| INVENTOR(S) | : Parkvall et al. | |

It is certified that error appears in the above-identified patent and that said Letters Patent is hereby corrected as shown below:

In Column 1, Line 9, delete "repeat request" and insert -- Repeat reQuest --, therefor.

In Column 1, Line 16, delete "repeat request" and insert -- Repeat reQuest --, therefor.

In Column 1, Line 59, delete "request" and insert -- reQuest --, therefor.

In Column 4, Line 18, delete "can" and insert -- an --, therefor.

In Column 9, Line 50, delete "form" and insert -- from --, therefor.

In Column 10, Line 17, delete "expected!" and insert -- expected. --, therefor.

In Column 14, Line 25, in Claim 48, delete "tine" and insert -- the --, therefor.

In Column 16, Line 27, in Claim 74, delete "MARQ" and insert -- HARQ --, therefor.

In Column 16, Lines 27-28, in Claim 74, delete "E-I HCH" and insert -- E-HICH --, therefor.

In Column 16, Line 28, in Claim 74, delete "E DCH." and insert -- E-DCH. --, therefor.

In Column 16, Line 34, in Claim 76, delete "UTFIAN." and insert -- UTRAN. --, therefor.

Signed and Sealed this
Twentieth Day of November, 2012

David J. Kappos
*Director of the United States Patent and Trademark Office*